United States Patent [19]  [11] 4,137,632
Pfanzer  [45] Feb. 6, 1979

[54] JIG-SAW

[75] Inventor: Gerhard Pfanzer, Camberg, Fed. Rep. of Germany

[73] Assignee: The Black and Decker Manufacturing Company, Towson, Md.

[21] Appl. No.: 848,057

[22] Filed: Nov. 3, 1977

[30] Foreign Application Priority Data

Dec. 8, 1976 [DE] Fed. Rep. of Germany ....... 2655583

[51] Int. Cl.² .......................... B27B 11/02; B27B 19/09
[52] U.S. Cl. ........................................... 30/393; 74/50
[58] Field of Search ....................... 30/392, 393; 74/50; 128/317

[56] References Cited

U.S. PATENT DOCUMENTS

| 3,236,111 | 2/1966 | Naslund | 74/50 |
| 3,269,197 | 8/1966 | Enders | 74/50 |
| 3,457,796 | 7/1969 | Leach et al. | 30/393 X |
| 3,890,708 | 6/1975 | Bauer | 30/393 |
| 3,978,862 | 9/1976 | Morrison | 30/393 |
| 4,031,763 | 6/1977 | Eisenberg | 74/50 |

Primary Examiner—Jimmy C. Peters
Attorney, Agent, or Firm—Walter Ottesen; Leonard Bloom; Edward D. Murphy

[57] ABSTRACT

The invention is directed to a power operated jig-saw which includes a housing and an elongated saw-blade holder for holding a saw-blade. A first bearing pivotally mounts the elongated saw-blade holder in the housing. A drive imparts a reciprocating up and down movement to the elongated saw-blade holder. A cam arrangement imparts a reciprocating movement to the elongated saw-blade holder and includes a body rotatably mounted in the housing and operatively connected to the drive. The rotating body has formed thereon a continuous cam surface extending about the axis of rotation thereof. The cam arrangement also includes a carrier and a resilient member. The carrier is mounted in the housing so as to be reciprocally movable in a direction transverse to the elongated saw-blade holder and carries a bearing for slideably holding the saw-blade holder. The resilient member urges the carrier into engagement with the cam surface whereby the carrier is reciprocated in response to the rotational movement of the cam surface causing a saw-blade attached to the saw-blade holder to trace out an enclosed path.

21 Claims, 6 Drawing Figures

JIG-SAW

BACKGROUND OF THE INVENTION

The invention relates to a jig saw equipped with a cam arrangement for developing a pendular movement of the saw-blade holder and saw blade.

It has been long known that it is advantageous if the saw blade or saw-blade holder is caused to traverse a closed path such as an elliptical path. This has been achieved by imparting to the saw blade or saw-blade holder a reciprocating movement in a direction transverse to the up and down reciprocating movement of the saw-blade holder. The transverse movement resulting in the orbital motion has been achieved in prior art devices by actuating the shaft or blade holder in the horizontal direction usually with the aid of a roller mounted on a lever such as a bell crank and actuated by the drive means of the tool. Still another arrangement calls for a reciprocating cam to impart a transverse movement to the saw-blade holder.

One such prior art apparatus is disclosed in U.S. Pat. No. 3,890,708 wherein a balancing weight is configured as an elongated member and is driven by an eccentric separate from the eccentric driving the saw-blade holder. The balancing member has a cam surface formed at its lower end which engages a roller mounted on a frame holding the saw-blade holder. The frame is resiliently biased toward the cam surface of the balancing member so that the reciprocating movement of the balancing member produces a lateral reciprocating movement of the frame and therefore of the saw-blade holder. That is, a supplementary movement in the feeding direction of the saw-blade is achieved. Means are also provided for adjusting the stroke of the lateral reciprocating movement.

This known jig-saw is not only expensive to construct since in addition to the usually eccentric drive for the saw-blade holder, a supplementary eccentric drive is needed for achieving the upward and downward movement of the balancing member. And this balancing member also needs an additional guide arrangement so that it will not deviate from its pre-determined upward and downward movement. Furthermore, the desired form of the pendular movement is not achieved. As already mentioned, the balancing member also constitutes the balancing weight and it is therefore necessary that the balancing member be reciprocated in exactly 180° phase-angle relation with respect to the saw-blade holder. Therefore, the balancing member is moved to its highest position when the saw-blade holder is at its lowest position and vice versa. This arrangement causes the saw-blade to move along an inclined path. However, it is not a true pendular movement wherein a specific point on the saw-blade traces out an enclosed path.

Jig saws are also known wherein the lateral movement for achieving pendular motion is achieved with the aid of a bell-crank lever actuated by a drive. The bell-crank engages the saw-blade to move the same in the horizontal direction while at the same time a scotch-yoke mechanism causes the blade to reciprocate in the upward and downward direction. In this kind of arrangement, the transverse movement is imparted directly to the saw-blade by means of a roller at one end of the bell-crank lever. The roller is situated such that the waste chips cut out by the saw blade from the workpiece will get between the saw blade and the roller and contribute to a wearing of the roller. In addition, this construction is expensive and requires a large number of individual parts so that assembly costs are high.

There are still other arrangements for achieving pendular motion of the saw-blade which likewise use a roller. For example, the transverse motion is achieved by configuring the back end-face of the saw-blade as a cam surface and as this cam surface rides on the roller, a movement in the transverse direction is achieved. This arrangement has the disadvantage that specially made saw-blades are needed in lieu of standard saw-blades. Further, an adjustment of the orbital loop is achieved only by installing a saw blade having a different cam surface formed on its rear end-face.

SUMMARY OF THE INVENTION

In view of the foregoing, it is an object of my invention to provide a jig saw wherein the pendular movement of the saw-blade is achieved by a direct coupling to the drive means which does not require an additional eccentric. It is another object of my invention to provide an arrangement wherein the transverse motion in feed direction is applied to the saw-blade holder at a location spaced away from the saw-blade where it cannot be contaminated by the chips cut by the saw-blade.

It is still another object of my invention to provide a jig saw which requires no specially configured saw blades to achieve pendular motion.

It is a further object of my invention to provide a jig saw wherein the shape of the enclosed path traced by the saw-blade during pendular motion is independent of the position of the saw-blade holder. Also, it is an object of my invention to provide a jig saw wherein the enclosed path traced by the saw-blade can be made to have a pre-determined shape.

The power operated portable jig saw of my invention includes a housing and an elongated saw-blade holder for holding the saw-blade. A bearing is provided for pivotally mounting the elongated saw-blade holder in the housing. Drive means are included for reciprocating the saw-blade holder in a substantially up and down direction. It is a feature of my invention to provide rotatable non-eccentric cam means operatively connected to the drive means for imparting a reciprocating movement to the saw-blade holder transverse to the reciprocating movement in the up and down direction.

According to a feature of my invention, the cam arrangement for imparting the transverse movement to the elongated saw-blade holder includes a body rotatably mounted in the housing and operatively connected to the drive means. The body defines an axis of rotation. A cam surface is formed on said body in surrounding relation to the axis of rotation. The cam surface is formed to have a pre-determined contour indicative of the shape of pendular path traced by a blade attached to the blade holder.

Translation means translate the rotational movement of the cam surface into a reciprocating movement of the saw-blade holder in a direction transverse to the vertical direction whereby a saw-blade attached to the saw-blade holder trace out the enclosed pendular path.

The translation means can include a carrier slideably holding the saw-blade holder and mounted on the housing so as to be reciprocably movable over a predetermined stroke length in a direction transverse to said saw-blade holder. A resilient member urges the carrier into engagement with the cam surface means whereby the carrier rides on the cam surface means and reciprocally moves through its pre-determined stroke length in response to the rotational movement of the cam surface.

By providing the above described cam arrangement, the jig-saw according to my invention achieves the advantage that a minimal number of parts are needed to provide the motion in the transverse direction and this eliminates the need for an additional eccentric. The cam arrangement provides a cam surface where the position of the cam surface with respect to the lower bearing of the saw-blade holder is continuously changing so that the carrier which is pressed against the cam surface moves in the horizontal direction and this provides the desired reciprocating movement in the transverse direction. In this way, the desired path traced by a point on the saw blade can be changed by configuring the form of the cam surface as desired. By forming the rotating cam surface means on a body rotatably mounted in the housing of the jig saw, the need for an additional eccentric mechanism and guide arrangement become unnecessary.

Further simplification in construction is obtained when an eccentric pin is provided on the same rotating body utilized to develop the motion transverse to the saw-blade holder. The eccentric is coupled directly to the saw-blade holder and generates the up and down reciprocating motion. In this instance, the rotating body on which the cam surface is formed constitutes part of the eccentric arrangement for driving the saw-blade holder and it fulfills two functions for which up until the present time completely separate drive arrangements were required. The rotating body is configured as a hub-like member and has an eccentric pin on its front end-face. This pin coacts with an elongated slot formed in the saw-blade holder and the pin and slot conjointly constitute eccentric means for reciprocating the saw-blade holder in the direction of its longitudinal axis.

In jig saws of the prior art mentioned earlier, both bearings of the elongated saw-blade holder are configured so that they only have a self-aligning function in the direction of the pendular movement. In contrast, in the instant invention, the lower bearing is mounted in a carrier slideably mounted in the housing so as to enable the cam surface formed on the hub-like member to coact therewith and be brought to bear thereagainst under the action of a resilient member such as a spring. In this way, it is possible to adjust the end position of the carrier, for example, with the aid of an eccentric shaft to thereby vary the stroke length. The eccentric shaft achieves a continuous adjustment of the range of the stroke length of the transverse movement between a maximum and zero by shifting the end position of the carrier in the region of the cam surface of the hub member which acts on the carrier.

BRIEF DESCRIPTION OF THE DRAWING

These and other objects and advantages of my invention will become more apparent from a consideration of the detailed description to follow when taken in conjunction with the drawing annexed hereto wherein.

DESCRIPTION OF THE PREFERRED EMBODIMENTS OF THE INVENTION

Figure 1:
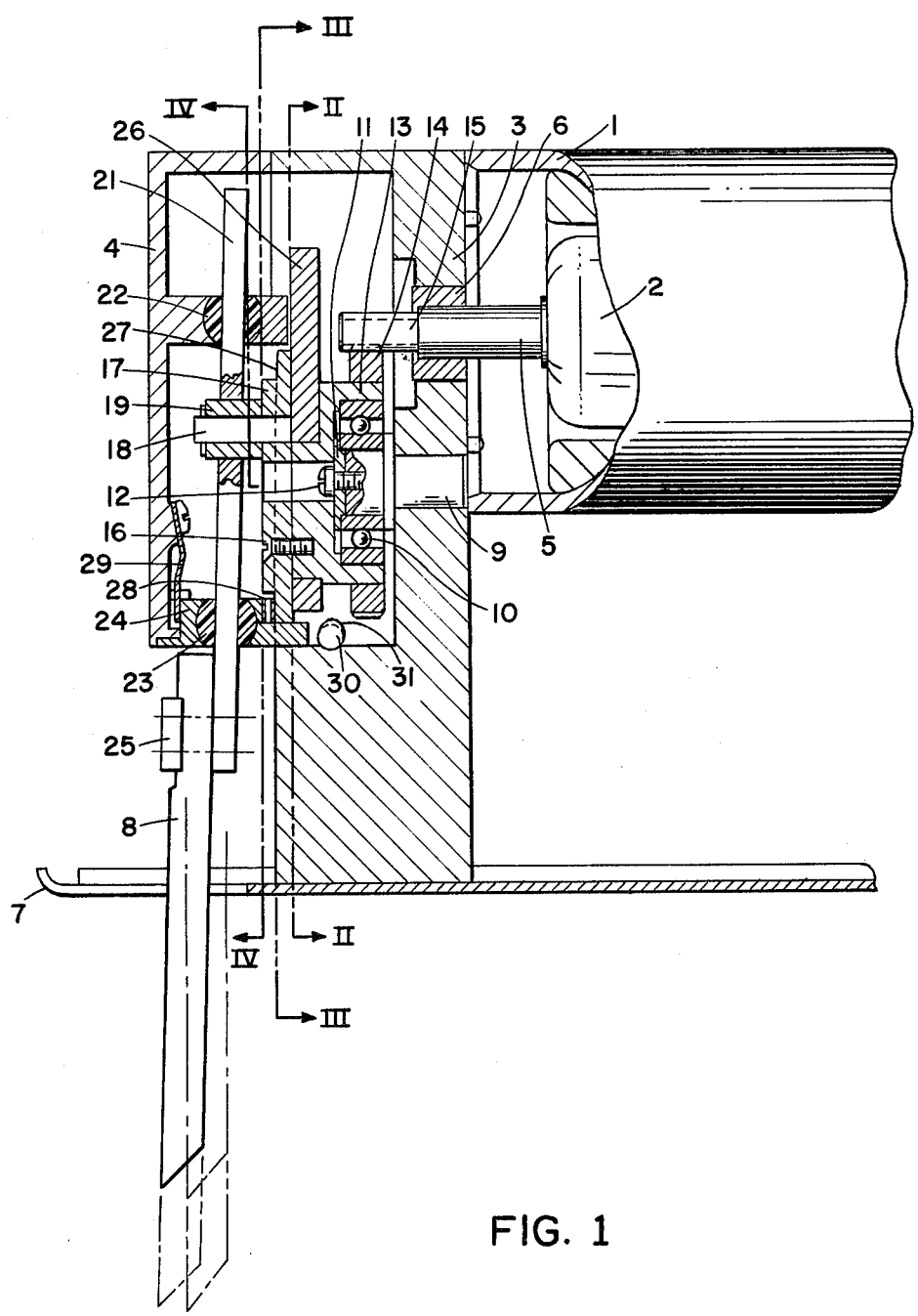
FIG. 1 is a schematic diagram showing an elevation view, partially in section, of the jig saw according to my invention.

The jig saw illustrated in FIG. 1 includes a motor housing 1 containing a motor 2 which constitutes part of the drive means. A gear case 3 is secured to the housing 1. The free end of the armature shaft 5 of the drive motor 2 extends into the gear case 3 and is journalled in a bearing 6. The gear case 3 is provided with a gear-case cover 4 and at the lower end of the gear case, there is secured a shoe 7 having a bifurcated front end so that the saw blade 8 can pass therethrough.

A shaft 9 is arranged parallel to the armature shaft 5 within the gear-case housing 3 and carries the inner race of a bearing 10. The bearing 10 is held in place with the aid of a disc 11 which is secured to the end of the shaft with the aid of a threaded member 12. The outer race of the bearing 10 is mounted in a bushing 13 defining a continuous surface upon which a gear 14 is press-fitted. The gear 14 engages with the pinion 15 so that when the armature shaft 5 rotates, the bushing 13 will rotate about the longitudinal axis of the shaft 9.

Figure 4:
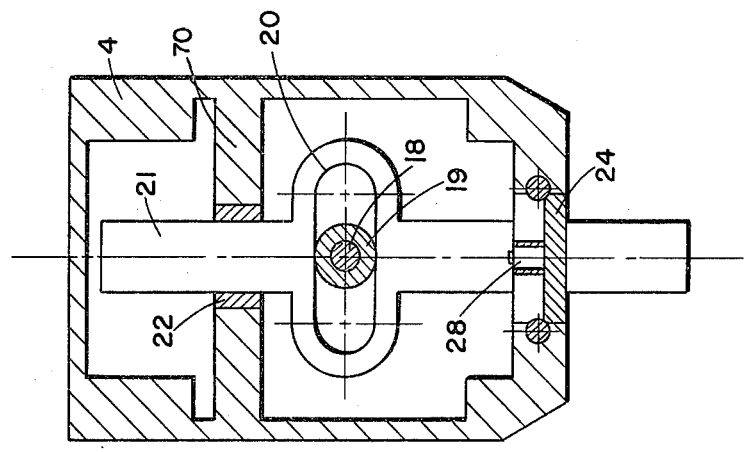
FIG. 4 is a section view taken along line IV—IV of FIG. 1 and shows the saw-blade holder and the eccentric pin engaging a longitudinal slot formed in the saw-blade holder.

Screws 16 secure a cam disc 17 to the bushing 13. The cam disc 17 has a centroidal axis coaxial with the longitudinal axis of the shaft 9. An eccentric pin 18 is mounted on the cam disc 17 and is radially spaced from the centroidal axis of cam disc 17 and carries a bearing 19 at its free end. This bearing 19 extends into an elongated opening 20 (FIG. 4) formed in the elongated saw-blade holder 21. The opening 20 extends perpendicular to the longitudinal axis of the saw-blade holder 21. With this arrangement, a rotation of the cam disc 17 about its centroidal axis produces an eccentric rotational movement of the pin 18 to reciprocate the saw-blade holder 21 in the direction of its longitudinal axis.

The elongated saw-blade holder 21 is held by an upper bearing 22 and a lower bearing 23. These bearings are self-aligning bearings in that they are free to rotate within a limited range. The upper bearing 22 is connected to the gear-case cover 4 with the aid of a cross member 70; whereas, the lower bearing 23 is mounted in a carrier 24 whose function will be described below. At the lower end of the saw-blade holder 21 which extends out beyond bearing 23, a clamp 25 is provided for mounting a saw-blade 8.

Figure 2:
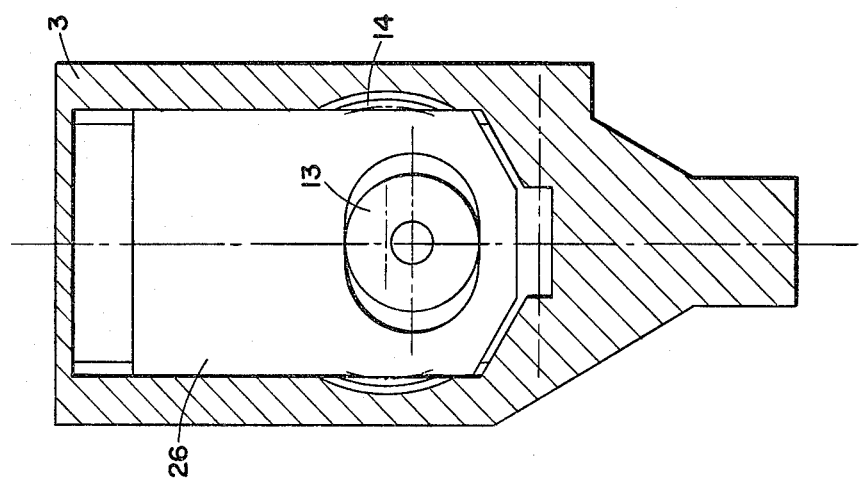
FIG. 2 is a section view taken along line II—II of FIG. 1 and shows the balancing weight guided in the housing of the tool.

The cam disc 17 is caused to rotate about its centroidal axis when the armature shaft 5 drives the gear 14. At the same time, the eccentric pin 18 moves through a circle and actuates the saw-blade holder 21 through an upward and downward movement. A balancing weight 26 is arranged on the bushing 13 for reducing to a minimum both vibration and loads on the bearings caused by imbalances (FIG. 2).

Figure 3:
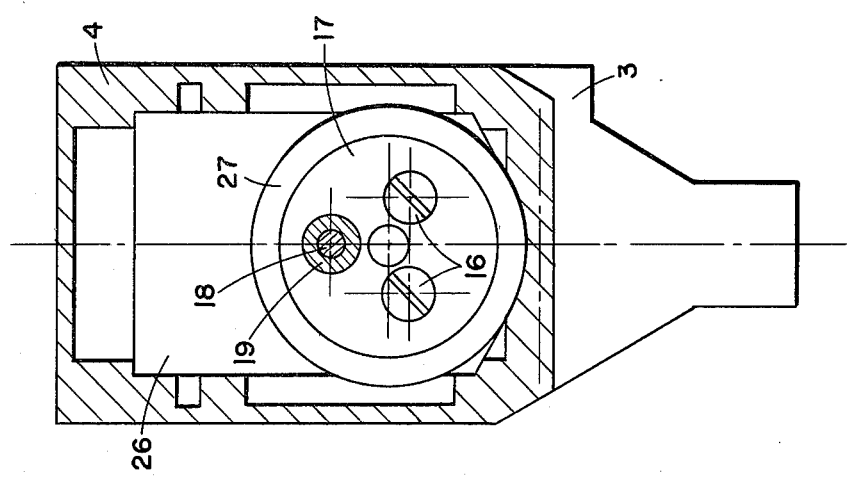
FIG. 3 is a section view taken along line III—III of FIG. 1 and shows the eccentric pin for actuating the elongated saw-blade holder in the up and down direction as well as the continuous cam surface for acting upon the carrier.

The cam disc 17 includes a cam surface means in the form of a cam surface 27 having an annular configuration and extending about the periphery of the cam disc as shown in FIG. 3. The cam surface 27 lies approximately in a plane which extends at an incline with respect to the centroidal axis of the cam disc 17. The cam surface 27 is shown engaging the bearing 28 of the carrier 24. The carrier 24 holds the lower bearing 23 and is resiliently biased by means of a leaf spring 29 which urges the carrier 24 toward the right.

Accordingly, when the cam disc 17 is rotated about its centroidal axis, the working surface of cam 27 engages the carrier 24. The working surface of cam 27 is contoured to have pre-determined elevations about its annular length. More specifically, the portion of the cam surface lying at the upper portion of the cam disc for the rotational position thereof as viewed in FIG. 1 is further to the right as the portion of the cam surface 27 lying in the lower portion of the cam disc. Since the spring 29 is placed so that it urges the carrier 24 toward the right, a rotation of the cam disc 17 through 180° with respect to the position shown causes the carrier 24 to move to the right under the action of spring 29; and, during a further rotation of 180°, the cam disc 17 will cause the carrier 24 to return to the position shown in FIG. 1. In this way, the carrier 24 is caused to reciprocate in a direction transverse to the longitudinal dimension of the saw-blade holder 21. This transverse movement is superimposed on the up and down movement so that a saw-blade 8 attached to the saw-blade holder 21 undergoes a pendular movement and traces an enclosed path.

The carrier 24 and resilient means in the form of spring 29 are exemplary of translation means for translating the rotational movement of the cam surface means 27 into a reciprocating movement of the saw-blade holder 21 in a direction transverse to the vertical direction in which the saw-blade holder 21 is reciprocated by pin 18.

The cam disc 17 rotatably mounted in the housing 3 and the cam surface means 27 together with the translation means can be viewed as conjointly constituting non-eccentric cam means. The cam surface 27 rotates symmetrically about the centroidal axis of the cam disc 17.

A shaft 30 extends in a direction perpendicular to the plane of the FIG. 1 and is equipped with a cam 31 inside the housing 3. The shaft 30 is rotatable from outside of the housing 3 to thereby rotate the cam 31. In FIG. 1, the cam 31 is shown in a position with its highest elevation directed upwardly from the axis of the shaft 30. When the shaft 30 is rotated, the surface of cam 31 is moved into the path of the carrier 24 and limits its horizontal movement. One of the end positions of the horizontal movement of the carrier is changed. The carrier 24 reciprocates in the horizontal direction and can be limited in its movement toward the right by cam 31 which defines end positions extending from the one illustrated wherein the carrier 24 can move so far to the right that the bearing 28 of the carrier 24 is caused to be in engagement with the cam surface 27 throughout the entire rotation of the cam disc 17 and, a second end position wherein the cam 31 engages the carrier 24 so that it is held out of contact with the cam surface 27 entirely. In this last-mentioned position, the saw-blade holder is not actuated at all in the transverse direction; whereas, in the first mentioned end position, the carrier moves through its maximum stroke. Between these two end positions, any desired end position can be set thereby maintaining a desired stroke for the transverse reciprocating movement.

The contour of the closed path can be dimensioned as desired by configuring the cam surface 27 of the cam disc 17 in a predetermined manner. The form of the cam surface 27 is completely independent of the position of the balancing weight 26.

The pendular movement when viewed from a point on the saw-blade traces a closed path. For this movement, a transverse reciprocating movement would have to take place for at least a portion of the upward movement of the saw-blade holder 21 in order to support the saw-blade as it cuts into the workpiece during the upward cutting stroke. Preferably, at the end or just before the end of the upward movement of the saw-blade, the saw-blade should be moved out of engagement with the workpiece by a movement in a direction opposite to the feeding direction, and then, during the downward movement the saw-blade holder 21, the blade 8 should be moved again into the starting position for the upward cutting stroke.

Figure 5:
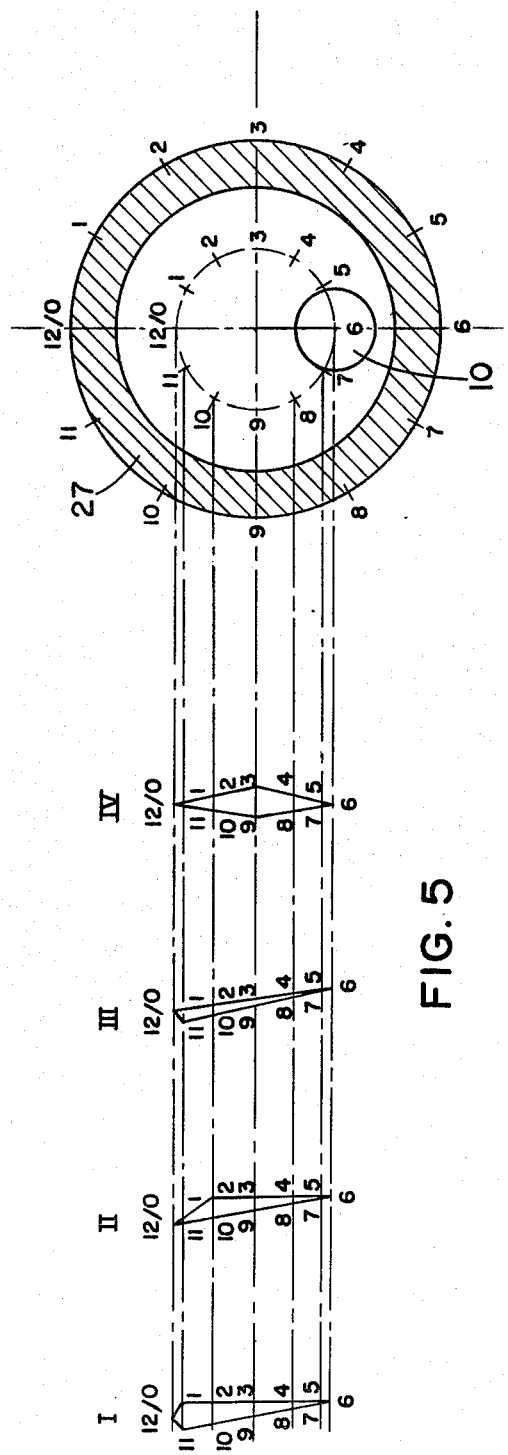
FIG. 5 shows several enclosed paths which a saw-blade can trace depending upon the contours of the cam surface; and, FIG. 6 is an expanded elevation view of the cam surfaces required to generate corresponding ones of the paths shown in FIG. 5.

Several pendular paths which can be traced by a saw-blade held in a jig saw according to my invention are shown in FIG. 5 and are designated by I, II, III, and IV. These paths are generated with cam discs having respective cam surfaces 27 corresponding to the expanded plan views shown in FIG. 6 and designated by corresponding reference numerals I, II, III, and IV, respectively. FIG. 5 also shows a plan view of the cam surface 27 marked off in twelve 30° arcuate segments having numbered starting and end points. Points on the respective enclosed paths of FIG. 5 are correspondingly numbered. In addition the position of the eccentric pin 10 is also shown.

Figure 6:
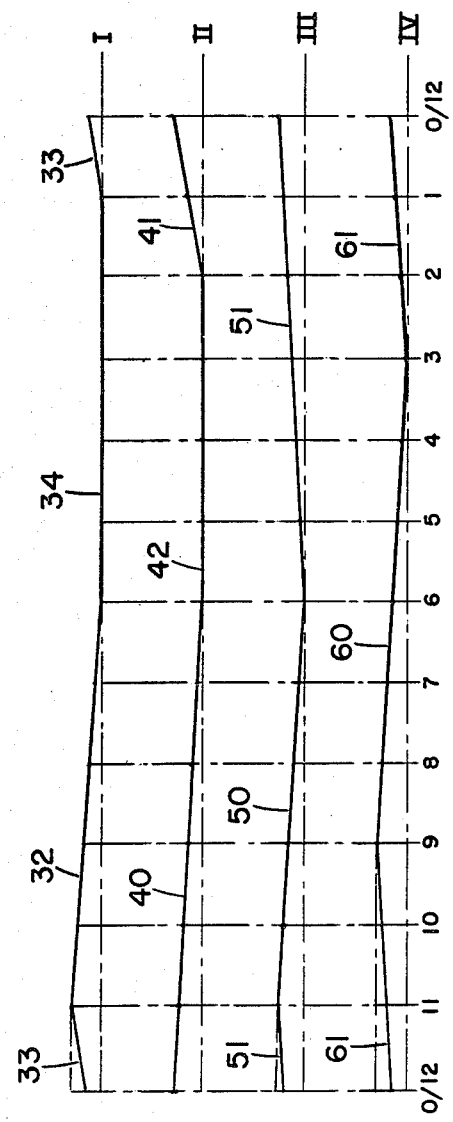

The pendular paths of FIG. 5 traced by various cam surfaces 27 shown in FIG. 6 are obtained by viewing a point location on the saw blade as the saw-blade moves through its composite movement wherein full reciprocation takes place in the direction transverse to the longitudinal dimension of the saw-blade holder 21. For example, the path I of FIG. 5 is obtained by utilizing a cam disc having a cam surface with the contour designated by numeral I in FIG. 6. The direction of movement of the observed location on the saw-blade through its working stroke and return stroke are indicated by arrows in FIG. 5.

Reference is now made to path I traced by an observed point location on the saw-blade as it moves through its pendular movement. Starting at the uppermost point 12/0, the observed point location moves down an inclined segment to point 1. The movement through this segment corresponds to a rotation of the cam 27 through 30°. Thereafter, the observed point of the saw-blade moves downwardly in a vertical direction and reaches point 6 after a rotation of the cam 27 of 180° from the starting point 12/0. At point 6, the saw-blade is at the end of the downward stroke. Thereafter, the upward stroke of the saw-blade holder 21 and therewith the saw-blade 8 produces an inclined movement of the saw-blade from point 6 to point 11 during which time the saw-blade engages the workpiece. This engagement is reinforced throughout the upward movement from point 6 to point 11 so that a cutting action is produced which continues up to point 11 or just 30° before reaching the starting position 12/0 of the cam 27. When the point 11 is reached, the observed point location on the saw-blade moves diagonally to point 12/0 thereby withdrawing the saw blade from cutting engagement with the workpiece. When point 12/0 is reached, a complete rotation of the cam 27 has been completed.

As the path I in FIG. 5 shows, the resulting pendular stroke is between points 1 and 11 and the effective support of the cutting operation results between points 6 and 11.

A specially contoured cam surface achieves the pendular movement described by path I. The expanded linear view designated by numeral I in FIG. 6 shows the elevation and slope which the cam surface 27 must have at and between the particular points 12/0, and 1 to 11 for acting on the carrier 24 to obtain the enclosed path I of FIG. 5. Referring to FIG. 5, the points on the enclosed curve correspond to the radial locations on the cam surface 27 shown in the right-hand portion of FIG. 5.

In FIG. 6, the transverse movement for path I of FIG. 5 during the work stroke between points 6 and 11 is produced by the inclined region 32 of the cam surface 27 also designated by numeral I in FIG. 6. At the left end of the inclined region 32 at point 11, there is another inclined portion 33. However, portion 33 is inclined at a slope opposite to portion 32. This portion 33 extends from point 11 through point 12/0 to point 1 and causes a movement of the saw-blade in the direction opposite to that for the portion 32 so that the flat portion 33 moves the saw-blade away from the workpiece as is shown in FIG. 5 for path I going from point 11 through point 12/0 to point 1.

The portion 33 runs into a flat portion 34 having zero slope which is connected to inclined portion 32 at point 6. This portion 34 of the cam surface 27 lies in a plane extending perpendicular to the centroidal axis of the cam disc 17 and defines the furtherest distance to the right which the carrier 24 can travel in the course of its reciprocating movement. When portion 34 acts upon the saw-blade, there is no transverse movement of the carrier 24 and hence of the saw-blade 8; instead the saw-blade 8 moves from point 1 without transverse movement perpendicular downwardly to point 6 and then, the inclined portion 32 moves the carrier 24 to the left as seen in FIG. 1 and the saw-blade 8 is urged into cutting engagement with the workpiece as already described.

For path II in FIGS. 5 and 6, the cam portions 40, 41 and 42 of the cam surface 27 are 30° displaced with respect to corresponding surfaces for path I. The pendular movement resulting from path II is shown in FIG. 5 under numeral II and distinguishes from the pendular movement of path I likewise by a 30° displacement which produces the result that the movement of the saw-blade away from the workpiece which occurs for path I between points 11 and 1 over a rotational movement of 60° of the cam surface 27 begins with path II only at point 12/0 and then extends also over 60° to point 2.

The examples represented by III and IV are achieved with cam surfaces 27 contoured to have inclined portions 50 and 51 for path III and inclined portions 60 and 61 for path IV as shown in FIG. 6. This type of contour of the cam surface with only two inclined portions produces the movement of the saw-blade 8 as shown in FIG. 5. For this movement, there is no location wherein the cam surface extends in a direction perpendicular to the centroidal axis of the cam disc 17; that is, there is no portion of the cam surface that has zero slope and the saw-blade moves either into the workpiece or away from the workpiece between turning points. For example, for path III, from point 6 to point 11, the saw-blade 8 moves into the workpiece and, between points 11 and 12/0 and between 12/0 and point 6, the saw blade moves away from the workpiece.

The foregoing shows that the cam surface can be contoured over its arcuate length to have a predetermined elevation in the direction of the stroke of the carrier 24 to thereby reciprocate the carrier 24 through its stroke length in response to the rotation of the cam disc 17 about its rotational axis. The slope of the cam surface 27 is selected to cause the carrier 24 to be reciprocated in such a manner that the tip of the blade 8 connected to the saw-blade holder 21 traces out an enclosed path of predetermined shape.

The contour of path I provides especially good cutting characteristics since the saw blade is moved into the workpiece for almost the entire unward stroke from point 6 up to point 11. At point 11 the saw blade moves through point 12/0 to point 1 thereby withdrawing the blade from cutting engagement and providing ample space to clear the chips before the blade moves downwardly to point 6.

Referring again to FIG. 1, it is noted that the entire operating mechanism of the jig saw is contained in the housing 3 and cover 4. The fact that the lower bearing 23 is enclosed as shown insures that it remains lubricated for a much greater time than it would be if it were exposed like the rollers of the prior art jig saws already discussed.

The bearings 22 and 23 are sleeve bearings and hold respective portions of the saw-blade holder 21. The bearings 22 and 23 are of substantially cylindrical configuration and are arranged in the carrier and housing, respectively, so as to have their respective longitudinal axes extend transverse to the longitudinal axis of the saw-blade holder 21. The bearings are seated to permit rotation only about their respective longitudinal axes and each of the bearings has a rectangular slot for slideably accommodating the saw-blade holder 21 therein whereby the saw-blade holder is firmly held in the bearings to minimize bending about the longitudinal axis of the saw-blade holder. Also, the wide bearing surface within the bearings proper causes the saw-blade holder 21 to be subjected to a distributed load rather than a point load as is the case, for example, in those jig saws of the prior art wherein a roller supports the saw-blade on its back end-face.

I claim:

1. A power operated jig saw comprising:

a housing;

an elongated saw-blade holder for holding a saw-blade, the saw-blade holder defining a longitudinal axis;

bearing means for pivotally mounting said saw-blade holder in said housing;

drive means for reciprocating the saw-blade hoder in the direction of said longitudinal axis; and, rotatable non-eccentric cam means operatively connected to said drive means for imparting a reciprocating movement to said saw-blade holder transverse to the reciprocating movement in said direction of said longitudinal axis whereby a saw-blade attached to said saw-blade holder will trace out an enclosed path of predetermined shape.

2. The power operated jig saw of claim 1 wherein said rotatable non-eccentric cam means comprises:

a body rotatably mounted in said housing and operatively connected to said drive means; said body defining an axis of rotation;

cam surface means formed on said body for rotation therewith; and, translation means for translating the rotational movement of said cam surface means into a reciprocating movement of said saw-blade holder in a direction transverse to said vertical direction whereby a saw-blade attached to said saw-blade holder will trace out said enclosed path.

3. The power operated jig saw of claim 2 comprising: a counterbalancing weight slideably arranged in said housing, and eccentric means formed on said body and said weight for reciprocating said weight in said housing.

4. The power operated jig saw of claim 2, said translation means including:

a carrier slideably holding said elongated saw-blade holder and mounted on said housing so as to be reciprocally movable over a predetermined stroke length in a direction transverse to said saw-blade holder; and, resilient means for urging said carrier into engagement with said cam surface means whereby said carrier rides on said cam surface means and reciprocally moves through said predetermined stroke length in response to the rotational movement of said cam surface means.

5. The power operated jig saw of claim 4, said bearing means comprising:

a first pivot bearing mounted in said housing for slideably holding said saw-blade holder at one portion thereof; and, a second pivot bearing mounted on said carrier for slideably holding said saw-blade holder at the remaining portion thereof.

6. The power operated jig saw of claim 5 wherein said portions of said saw-blade holder are of rectangular cross-section and wherein said bearings are of substantially cylindrical configuration and arranged in said housing and said carrier, respectively, so as to have their respective longitudinal axes extend transverse to said longitudinal axis of said saw-blade holder, said bearings being seated in said housing and said carrier, respectively, so as to permit rotation only about their respective longitudinal axes, each of said bearings having a rectangular slot for slideably accommodating said saw-blade holder therein whereby said saw-blade holder is firmly held in said bearings to minimize bending about said longitudinal axis of said saw-blade holder.

7. The power operated jig saw of claim 4 wherein said cam surface means comprises an annular face cam concentric with said rotation axis.

8. The power operated jig saw of claim 7 wherein said body is mounted in said housing with said rotation axis being substantially parallel to the stroke of said carrier, said cam surface being contoured at each point along its arcuate length to have a predetermined elevation to the direction of said stroke of said carrier to thereby reciprocate said carrier through said stroke length in response to the rotation of said body about said rotational axis thereof, the slope of said cam surface being selected to cause said carrier to be reciprocated in such a manner that the tip of a blade connected to said saw-blade holder traces out an enclosed path of predetermined shape as said saw-blade holder is reciprocated by said drive means whereby optimum cutting characteristics are obtained.

9. The power operated jig saw of claim 8 comprising: roller means at the interface of said carrier and said annular cam surface for minimizing friction therebetween.

10. The power operated jig saw of claim 4 comprising:

means for adjusting said stroke length of said carrier.

11. The power operated jig saw of claim 10 wherein said adjusting means comprises: a cam eccentrically mounted on said housing so as to be rotatable into the path of said carrier so as to vary the magnitude of said stroke length through a range extending from said predetermined stroke length to zero stroke length.

12. The power operated jig saw of claim 2 wherein said drive means comprises: eccentric means formed on said body and said saw-blade holder for reciprocating said saw-blade holder in the direction of said longitudinal axis.

13. A power operated portable jig saw comprising:

a housing;

a saw-blade holder for holding a saw-blade;

bearing means for pivotally mounting said holder in said housing;

drive means for reciprocating said saw-blade holder in a substantially vertical direction; and, a cam arrangement for imparting a pendular movement to said saw-blade holder; the cam arrangement including:

a body rotatably mounted in said housing and operatively connected to said drive means, said body defining an axis of rotation;

said body having a cam surface in surrounding relation to said axis of rotation, said cam surface being formed on said body to have a predetermined contour indicative of the shape of the pendular path traced by a blade attached to said blade holder; and, translation means for translating the rotational movement of said cam surface into a reciprocating movement of said saw-blade holder in a direction transverse to said vertical direction whereby a saw-blade attached to said saw-blade holder will trace out said pendular path.

14. The power operated portable jig saw of claim 13 wherein said drive means comprises eccentric means formed on said body and said saw-blade holder for reciprocating said saw-blade holder in said vertical direction.

15. A power operated portable jig saw comprising:

a housing;

an elongated saw-blade holder for holding a saw-blade, the saw-blade holder defining a longitudinal axis;

drive means for reciprocating said saw-blade holder in a substantially vertical direction;

a first pivot bearing mounted in said housing for slideably holding said saw-blade holder at one portion thereof;

a second pivot bearing for slideably holding said saw-blade holder at the remaining portion thereof;

a cam arrangement for acting on said second pivot bearing to reciprocate the same transversely to said vertical direction thereby imparting a pendular movement to said saw-blade holder; the cam arrangement including:

a body rotatably mounted in said housing and operatively connected to said drive means, said body defining an axis of rotation;

cam surface means formed on said body for rotation therewith; and, translation means for translating the rotational movement of said cam surface means into a reciprocating movement of said second pivot bearing over a predetermined stroke length in a direction transverse to said vertical direction whereby a saw blade attached to said saw-blade holder will trace out an enclosed pendular path.

16. The power operated portable jig saw of claim 15, said translation means including:

a carrier holding said second pivot bearing, said carrier being mounted in said housing so as to be reciprocally movable over said predetermined stroke length in said direction transverse to said vertical direction; and, resilient means for urging said carrier into engagement with said cam surface means whereby said carrier rides on said cam surface means and reciprocally moves through said predetermined stroke length in response to the rotational movement of said cam surface means.

17. The power operated portable jig saw of claim 16 wherein said cam surface means comprises an annular face cam concentric with said rotation axis.

18. The power operated portable jig saw of claim 17 wherein said body is mounted in said housing with said rotation axis being substantially parallel to the stroke of said carrier, said cam surface being contoured at each point along its arcuate length to have a predetermined elevation in the direction of said stroke of said carrier to thereby reciprocate said carrier through said stroke length in response to the rotation of said body about said rotational axis thereof, the slope of said cam surface being selected to cause said carrier to be reciprocated in such a manner that the tip of a blade connected to said saw-blade holder traces out an enclosed path of predetermined shape as said saw-blade holder is reciprocated by said drive means whereby optimum cutting characteristics are obtained.

19. The power operated portable jig saw of claim 16 comprising means for adjusting said stroke length of said carrier.

20. The power operated portable jig saw of claim 19 wherein said adjusting means comprises: a cam eccentrically mounted on said housing so as to be rotatable into the path of said carrier so as to vary the magnitude of said stroke length through a range extending from said predetermined stroke length to zero stroke length.

21. The power operated portable jig saw of claim 15 wherein said drive means comprises: eccentric means formed on said body and said saw-blade holder for reciprocating said saw-blade holder for reciprocating said saw-blade holder in the direction of said longitudinal axis.

* * * * *